(12) United States Patent
Tsunoo

(10) Patent No.: US 7,051,202 B2
(45) Date of Patent: May 23, 2006

(54) APPARATUS AND COMPUTER-RECORDING MEDIUM FOR EVALUATION SUPPORT OF ENCRYPTION ALGORITHM STRENGTH

(75) Inventor: Yukiyasu Tsunoo, Tokyo (JP)

(73) Assignee: NEC Corporation, Tokyo (JP)

( * ) Notice: Subject to any disclaimer, the term of this patent is extended or adjusted under 35 U.S.C. 154(b) by 1197 days.

(21) Appl. No.: 09/766,675

(22) Filed: Jan. 23, 2001

(65) Prior Publication Data

US 2001/0019609 A1 Sep. 6, 2001

(30) Foreign Application Priority Data

Jan. 24, 2000 (JP) ............................. 2000-017878

(51) Int. Cl.
*G06F 9/00* (2006.01)
*H04L 9/00* (2006.01)

(52) U.S. Cl. ................ 713/165; 713/155; 713/192; 380/47; 380/46; 380/44

(58) Field of Classification Search .............. 380/44, 380/46, 47; 713/193, 165, 155
See application file for complete search history.

(56) References Cited

U.S. PATENT DOCUMENTS 5,522,022 A * 5/1996 Rao et al. .................... 345/440
6,304,790 B1    10/2001 Nakamura et al.
6,330,527 B1 * 12/2001 Jung et al. .................... 703/22
6,504,929 B1 *  1/2003 Tsunoo ......................... 380/28
2002/0083134 A1 * 6/2002 Bauer et al. ................ 709/204

FOREIGN PATENT DOCUMENTS

| EP | 0 727 740 A2 | 8/1996 |
| EP | 0 932 272 A2 | 7/1999 |
| JP | 8-190344 | 7/1996 |
| JP | 10-240511 | 9/1998 |
| JP | 11-65438 | 3/1999 |
| JP | 11-212452 | 8/1999 |

OTHER PUBLICATIONS

Henry et al., "Complexity Measurement of a Graphical Programming Language", *Software–Practice and Experience*, Nov. 1989, pp. 1065–1088, vol. 19, No. 11, John Wiley & Sons, Ltd.

* cited by examiner

*Primary Examiner*—Norman M. Wright
(74) *Attorney, Agent, or Firm*—Foley & Lardner LLP

(57) ABSTRACT

An encryption evaluation support system, includes an evaluation executing unit, and a point storing unit. The evaluation executing unit receives a figure representation of an encryption algorithm. The figure representation includes a plurality of unit figures. The point storing unit stores points allocated to the plurality of unit figures respectively. The evaluation executing unit gives the points to the plurality of unit figures of the figure representation, respectively, to output the points given to the plurality of unit figures of the figure representation.

25 Claims, 16 Drawing Sheets

144: REPLACEABLE PART LIST

| REPLACEMENT SOURCE | REPLACEABLE BASIC BLOCK |
|---|---|
| BASIC BLOCK 412 | BASIC BLOCK 413, 415, 416, 417 |
| BASIC BLOCK 413 | BASIC BLOCK 415, 416, 417, 412 |
| BASIC BLOCK 415 | BASIC BLOCK 416, 417, 412, 413 |
| BASIC BLOCK 416 | BASIC BLOCK 412, 413, 415, 417 |
| BASIC BLOCK 417 | BASIC BLOCK 416, 412, 413, 415 |
| BASIC BLOCK 425 | BASIC BLOCK 424 |
| BASIC BLOCK 424 | BASIC BLOCK 425 |
| BASIC BLOCK 418 | BASIC BLOCK 419 |
| BASIC BLOCK 419 | BASIC BLOCK 418 |
| BASIC BLOCK 420 | BASIC BLOCK 421 |
| BASIC BLOCK 421 | BASIC BLOCK 420 |

| EVALUATION ITEM | SCORE OF BASIC BLOCK |
|---|---|
| A | |
| B | |
| ⋮ | |
| N | |

# APPARATUS AND COMPUTER-RECORDING MEDIUM FOR EVALUATION SUPPORT OF ENCRYPTION ALGORITHM STRENGTH

BACKGROUND OF THE INVENTION

1. Field of the Invention

The present invention relates to an encryption algorithm evaluation support system for supporting an evaluation work of an encryption algorithm.

2. Description of the Related Art

The importance of an encryption technique for preventing the leakage of information has been rising in conjunction with the rapid spread of network. There are roughly two encryptions of a common key encryption in which the same key is used in the encoding and the decoding and a public key encryption in which different keys are used such as a secret key and a public key. The common key encryption has a problem of a method in which a key is commonly used between a sender and receiver. However, it has a merit in which a calculation amount necessary for the encoding and the decoding is smaller than that of the public key encryption. Thus, it is used in many fields and uses.

On the one hand, the technique for decoding the encryption algorithm has rapidly made great progress. It is true that the security of a encryption currently being used can not be permanently insured. Thus, it is important to positively design a new encryption algorithm, which can endure a new decoding technique, and evaluate its strength in advance. Several techniques for attaining it have been conventionally proposed or put to practical use.

For example, Japanese Laid Open Patent Application (JP-A-Heisei, 10-240511) (hereafter, referred to as a document 1) proposes an encryption diagram editor in which a user can describe and edit the diagram representation in an entire block encryption algorithm by using a predetermined diagram representation, such as a diagram representation of a variable with a bit string data as a value, a diagram representation of an operation on a bit string data or a diagram representation for combining a variable and an operation, as an example of a conventional technique for supporting a design of an encryption algorithm. Also, the document 1 proposes a technique for automatically generating a block encryption program from a block encryption algorithm designed by using the encryption diagram editor, and a technique for testing whether or not this generated program accurately reproduces the original algorithm.

On the other hand, Japanese Laid Open Patent Application (JP-A-Heisei, 11-212452 corresponding to Japanese patent application No. Heisei 10-029132) (hereafter, referred to as a document 2) according to the prior application of this inventor proposes a encryption strength evaluation support system containing: a device for statistically determining a relative relation for each bit of an input/output data of an encryption program by using a large number of evaluation data (a clear-text, a key and the like); and a device for editing the relative relation for each determined bit into a table form or a graph form and outputting it, as an example of a conventional technique for supporting a strength evaluation of a developed encryption program. The content of a copending U.S. patent application Ser. No. 09/236,640 now U.S. Pat. No. 6,504,929B1, claiming a priority based on Japanese patent application No. Heisei 10-029132 corresponding to the document 2 is incorporated herein by reference.

The usage of the encryption diagram editor described in the document 1 enables the encryption algorithm to be effectively designed. Also, the usage of the encryption strength evaluation support system described in the document 2 enables the strength evaluation of the encryption program to be carefully carried out.

However, in order to carry out the strength evaluation of the designed encryption algorithm, it is necessary to execute a statistic process by using a large number of evaluation data, after generating an actual encryption program from the encryption algorithm. Thus, it takes a long time to determine the evaluation result. If the time until the end of an evaluation after the design of one encryption algorithm is made longer, the number of encryption algorithms that can be compared and considered within a limited design development period and the number of design change times are limited to thereby make the development of the encryption algorithm optimal for a usage purpose difficult.

Therefore, an object of the present invention is to provide a encryption evaluation support system that can largely reduce an evaluation time of an encryption algorithm.

Another object of the present invention is to provide a encryption evaluation support system in which even a person who is not a professional in encryption design can evaluate an encryption algorithm.

Japanese Laid Open Patent Application (JP-A-Heisei, 8-190344) discloses the following method for evaluating a strength of an encryption algorithm. It is provided with: an initial value setter for setting an initial value in searching for a maximum deviation rate in an n-stage linear representation of the encryption algorithm; a search candidate extractor for extracting a search pattern candidate from a limitation condition; a best representation searcher for searching for an n-stage linear representation having the maximum deviation rate under a target for a search pattern candidate set; a clear-text information amount calculator for calculating a clear-text information amount required to decode a encryption by using a linear decoding method in accordance with the maximum deviation rate; and an output device for outputting the clear-text information amount.

Japanese Laid Open Patent Application (JP-A-Heisei, 11-65438) discloses the following encryption strength evaluator. The encryption strength evaluator for obtaining a encryption text and determining its key is provided with: a first LSI for generating a table; a storing device for storing therein the generated table; a second LSI for processing the encryption text; a memory for picking up and expanding the table; a comparing processor for comparing the table with a value in which the encryption text is processed; a verifying processor for verifying a value picked up from this comparing processor; a third LSI for processing an initial value used in generating the table for the verification; a unit having the first LSI, the storing device, the second LSI, the memory and the comparing processor, and a local computer for controlling this unit. This evaluator preliminarily prepares a plurality of tables under the assumption of the clear-text, and obtains the encryption text, and then repeats the processing of the encryption text and the comparison with the table, and accordingly determines the key of the encryption.

SUMMARY OF THE INVENTION

The present invention is accomplished in view of the above mentioned problems. Therefore, an object of the present invention is to provide a encryption evaluation support system that can largely reduce an evaluation time of an encryption algorithm. Another object of the present invention is to provide a encryption evaluation support system in which even a person who is not a professional in encryption design can evaluate an encryption algorithm.

In order to achieve an aspect of the present invention, an encryption evaluation support system, includes: an evaluation executing unit receiving a figure representation of an encryption algorithm, wherein the figure representation includes a plurality of unit figures; and a point storing unit storing points allocated to the plurality of unit figures respectively, and wherein the evaluation executing unit gives the points to the plurality of unit figures of the figure representation, respectively, to output the points given to the plurality of unit figures of the figure representation.

In this case, the figure representation is a function block diagram.

Also in this case, the figure representation is described in a pre-defined encryption algorithm specification description manner, and wherein the unit figure is used in the encryption algorithm specification description manner.

Further in this case, the evaluation executing unit outputs the points to evaluate the encryption algorithm corresponding to the figure representation, before an encryption program is generated based on the encryption algorithm.

In this case, the encryption evaluation support system, further includes: an automatic replacing unit generating a changed figure representation in which at least one of the plurality of unit figures of the figure representation is automatically replaced by another unit figure, and wherein the point storing unit stores a point allocated to the another unit figure, and wherein the evaluation executing unit gives the points to a plurality of unit figures including the another unit figure of the changed figure representation, with reference to the point storing unit, respectively to output the points given to the plurality of unit figures of the changed figure representation.

Also in this case, the point storing unit stores the point allocated to the unit figure for each of a plurality of evaluation items, and wherein the evaluation executing unit gives the points for selected one of the plurality of evaluation items to the plurality of unit figures of the figure representation, respectively, with reference to the point storing unit to output the points for the selected one given to the plurality of unit figures of the figure representation.

Further in this case, the plurality of evaluation items include an evaluation item with regard to an encryption strength.

In this case, the plurality of evaluation items include an evaluation item with regard to an estimation of one of a size and a processing amount when the encryption algorithm is executed in one of a software and a hardware.

Also in this case, the evaluation executing unit gives the point to one of the plurality of unit figures of the figure representation, every time a signal flowing in the figure representation passes through the one of the plurality of unit figures of the figure representation.

Further in this case, the signal includes a plurality of bits, and wherein the plurality of bits of the signal are passed through the one of the plurality of unit figures in parallel, and wherein the point storing unit stores the point allocated to the unit figure for each of the plurality of bits, and wherein the evaluation executing unit gives the point for each of the plurality of bits to the unit figure with reference to the point storing unit, to output the point for each of the plurality of bits given to the figure representation.

In this case, the evaluation executing unit calculates a mean value of the points corresponding to the plurality of bits given to the figure representation, to output.

Also in this case, the encryption evaluation support system, further includes: an evaluation target editing unit supporting a user who generates the figure representation of the encryption algorithm based on the encryption algorithm specification description manner.

Further in this case, the encryption evaluation support system, further includes: a result editing unit presenting the points outputted by the evaluation executing unit in graphical form.

In this case, the result editing unit sorts the points outputted by the evaluation executing unit to present.

Also in this case, the encryption algorithm is a type of one of a common key cryptosystem and a public key cryptosystem.

In order to achieve another aspect of the present invention, a computer readable recording medium for recording a program for a process, includes: (a) receiving a figure representation of an encryption algorithm, wherein the figure representation includes a plurality of unit figures; (b) storing points allocated to the plurality of unit figures respectively; (c) giving the points to the plurality of unit figures of the figure representation, respectively; and (d) outputting the points given to the plurality of unit figures of the figure representation.

In this case, the figure representation is described in a pre-defined encryption algorithm specification description manner, and wherein the unit figure is used in the encryption algorithm specification description manner.

Also in this case, the (d) includes outputting the points to evaluate the encryption algorithm corresponding to the figure representation, before an encryption program is generated based on the encryption algorithm.

Further in this case, the computer readable recording medium for recording a program for a process, further includes: (e) generating a changed figure representation in which at least one of the plurality of unit figures of the figure representation is automatically replaced by another unit figure, and wherein the (b) includes storing a point allocated to the another unit figure, and wherein the (c) includes giving the points to a plurality of unit figures including the another unit figure of the changed figure representation, respectively, and wherein the (d) includes outputting the points given to the plurality of unit figures of the changed figure representation.

In this case, the (b) includes storing the point allocated to the unit figure for each of a plurality of evaluation items, and wherein the (c) includes giving the points for selected one of the plurality of evaluation items to the plurality of unit figures of the figure representation, respectively, and wherein the (d) includes outputting the points for the selected one given to the plurality of unit figures of the figure representation.

Also in this case, the (c) includes giving the point to one of the plurality of unit figures of the figure representation, every time a signal flowing in the figure representation passes through the one of the plurality of unit figures of the figure representation.

Further in this case, the signal includes a plurality of bits, and wherein the plurality of bits of the signal are passed through the one of the plurality of unit figures in parallel, and wherein the (b) includes storing the point allocated to the unit figure for each of the plurality of bits, and wherein the (c) includes giving the point for each of the plurality of bits to the unit figure, and wherein the (d) includes outputting the point for each of the plurality of bits given to the figure representation.

In this case, the (d) includes calculating a mean value of the points corresponding to the plurality of bits given to the figure representation, to output.

Also in this case, the computer readable recording medium for recording a program for a process, further includes: (f) presenting the points outputted by the (d) in graphical form.

Further in this case, the (f) includes sorting the points outputted by the (d) to present.

A encryption evaluation support system of the present invention is provided with: an evaluation target memory for storing therein a figure representation of an encryption algorithm described in a pre-defined encryption algorithm specification description manner; a point memory for storing therein a point of a unit figure that is used in the encryption algorithm specification description manner; and an evaluation executor for receiving the figure representation from the evaluation target memory, giving the point stored in the point memory to the unit figure in the figure representation and then calculating and outputting a score of the entire figure representation in accordance with a predetermined calculation rule. Moreover, it has an automatic replacer for generating a figure representation in which a unit figure selected by a user in a figure representation entered by the evaluation executor is automatically replaced by another kind of a unit figure. The evaluation executor employs a mechanism for calculating the scores with regard to the entered figure representation and the figure representation generated by the automatic replacer.

A technician having the professional knowledge with regard to the design and the evaluation of the encryption algorithm has the viewpoint necessary for the design and the development, such as the relative relation between a structure of an actually designed encryption algorithm and an evaluation result in the encryption strength evaluation support apparatus, for example, described in the document 2 and the like. The point of each unit figure stored in the point memory is set in accordance with the viewpoint of such a professional engineer. For example, a high point is given to a unit figure that is judged to have a good tendency with regard to a encryption strength, and a low point is given to a unit figure that is judged to have a bad tendency. Here, even in the same unit figure, if an evaluation item (for example, an avalanche evaluation, a bit balance evaluation or the like) is different, there may be a case that the tendency thereof is different. Thus, it is desirable to store in the point memory, a point of a unit figure for each of a plurality of predetermined evaluation items. Also, even in the same unit figure, there may be a case that the tendency thereof is different depending on a bit position. Thus, it is desirable that a point is set for each bit unit. In this case, for example, for each pass through a basic block along a flow of a signal in a figure representation, the evaluation executor adds a point of the basic block for each evaluation item, and, for example, calculating a bit score that is a score for each output bit in a figure representation and an item score that is an average of the bit scores, for each evaluation item.

Also, the encryption evaluation support system of the present invention is provided with: an evaluation target editor for supporting a user who describes and edits a figure representation of an encryption algorithm based on the encryption algorithm specification description manner; an evaluation result memory for storing therein a calculation result of the evaluation executor; a result editor for graphing and outputting the calculation result stored in the evaluation result memory. Thus, it can support a series of operations from the edition of the figure representation of the encryption algorithm through the calculation of the score to the comparison consideration after the graphing, under one system. Also, the result editor has a function of sorting the calculation result stored in the evaluation result memory by using an instruction sort key and then outputting it. Thus, this makes the judgment of the superiority or inferiority in the plurality of encryption algorithms further easier.

The encryption evaluation support system of the present invention can largely reduce an evaluation time of an encryption algorithm. Moreover, even a person who is not a professional in encryption design can carry out a strength evaluation and the like by using it.

A point of a unit figure used in a pre-defined encryption algorithm specification description manner is set in advance in a point memory, on the basis of the knowledge and the experience of a professional with regard to a encryption design and an evaluation. An evaluation target memory stores therein a figure representation (a function block diagram) of an encryption algorithm described in the encryption algorithm specification description manner. An evaluation executor receives the function block diagram from the evaluation target memory, in accordance with an instruction of a user from an input device, and gives a point stored in the point memory to a unit figure in it, and calculates a score in the entire function block diagram in accordance with a pre-determined calculation rule, and then outputs to a display.

DESCRIPTION OF THE PREFERRED EMBODIMENTS

Examples of embodiments of the present invention will be described below in detail with reference to the attached drawings.

It should be noted that there is a copending U.S. patent application Ser. No. 09/236,640, entitled "Encryption strength evaluation support apparatus and recording medium recording encryption strength evaluation support program", claiming a priority based on Japanese patent application No. Heisei 10-029132, invented by Yukiyasu Tsunoo who is an inventor of the present application, and assigned to an assignee who is an assignee of the patent application. The content of the copending US application is incorporated herein by reference.

Figure 1:
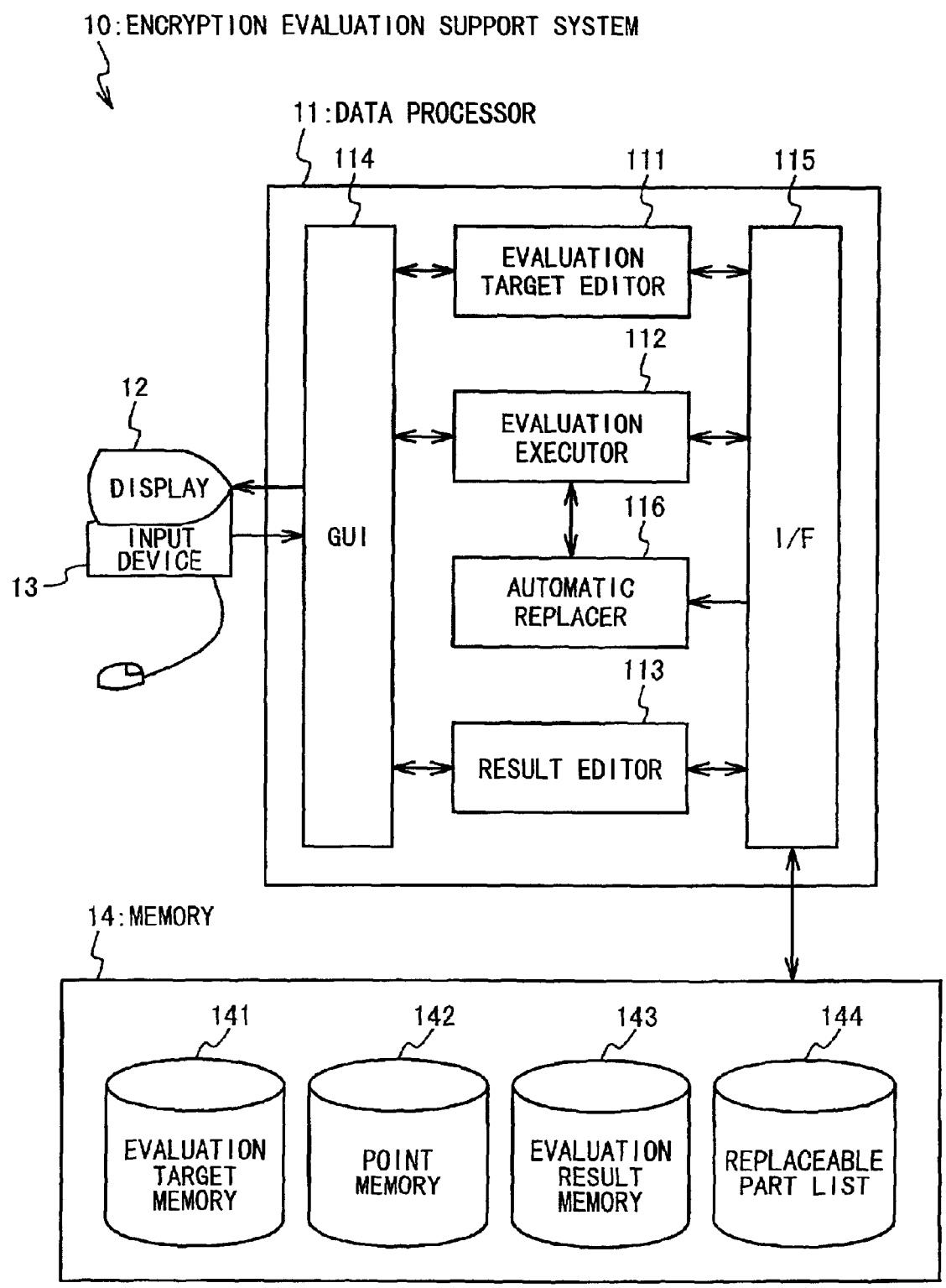
FIG. 1 is a block diagram showing a encryption evaluation support system according to an embodiment of the present invention.

Referring to FIG. 1, a encryption evaluation support system 10 according to an embodiment of the present invention is provided with a data processor 11, a display 12 connected to the data processor 11, an input device 13 and a memory 14.

The display 12 is, for example, a LCD. The input device 13 is, for example, a keyboard and a mouse. The memory 14 is, for example, a magnetic disk device. The data processor 11 is a computer body including a memory composed of, for example, MPU, ROM, RAM and the like. By the way, other peripheral devices, such as a printer and the like, may be connected.

An evaluation target editor 111, an evaluation executor 112 and a result editor 113 are mounted in the data processor 11. The evaluation target editor 111, the evaluation executor 112 and the result editor 113 are connected through a GUI 114 to the display 12 and the input device 13, and also connected through a memory interface 115 to the memory 14.

The evaluation target editor 111 supports a user who describes and edits a figure representation (hereafter, referred to as a function block diagram) of an encryption algorithm based on a pre-defined encryption algorithm specification description manner.

The evaluation executor 112 calculates a score in the entire function block diagram. The result editor 113 edits and outputs the calculated score. An automatic replacer 116 is connected to the evaluation executor 112 and the memory interface 115. The automatic replacer 116 automatically changes a part of the function block diagram.

By the way, in this embodiment, a common key encryption is targeted for a design. However, it may be applied to the public key encryption.

On the other hand, an evaluation target memory 141, a point memory 142, an evaluation result memory 143 and a replaceable part list 144 are mounted in the memory 14. The evaluation target memory 141 stores therein the function block diagram edited by the evaluation target editor 111. The point memory 142 stores therein a point for each evaluation item of a unit figure (hereafter, referred to as a unit block) used in the encryption algorithm specification description manner. The evaluation result memory 143 stores therein the result calculated by the evaluation executor 112. The replaceable part list 144 is referred by the automatic replacer 116.

The user uses the encryption evaluation support system 10, and repeats the following three operations: (1) the edition of a function block diagram; (2) the calculation of the scores in the function block diagram; and (3) the edition and the output of the calculation result. Then, the user proceeds with the development of an encryption algorithm satisfying a usage purpose. The (1) edition of the function block diagram corresponds to the design of the encryption algorithm, and it is mainly supported by the evaluation target editor 111. The (2) calculation of the scores in the function block diagram corresponds to the evaluation of the encryption algorithm, and it is mainly supported by the evaluation executor 112. The (3) edition output of the calculation result graphs and outputs the scores of the function block diagram, and it is supported by the result editor 113.

The detailed configurations and operations of this embodiment will be described below in the respectively divided cases.

(1) Edition of Function Block Diagram

Figure 2:
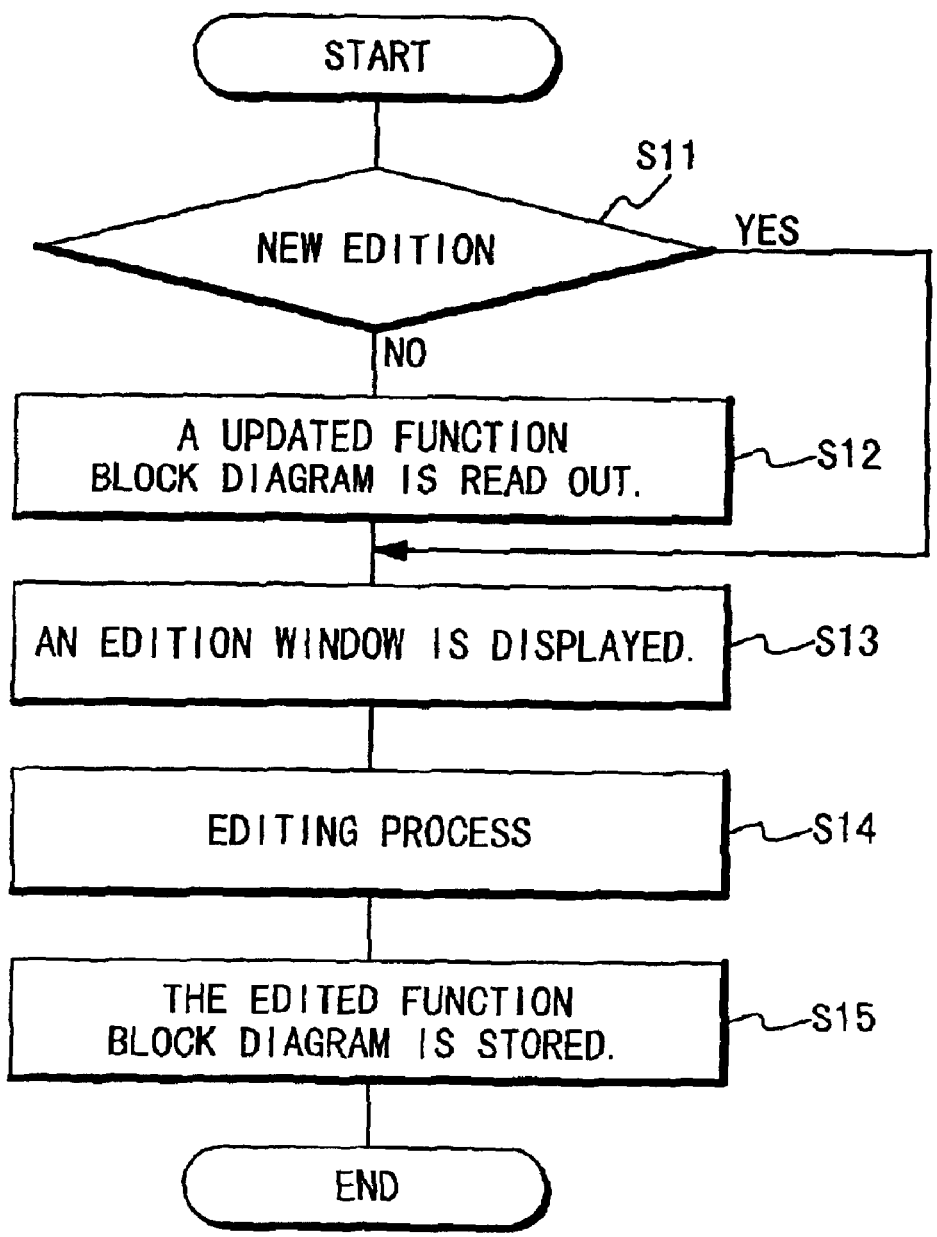
FIG. 2 is a flowchart showing a processing example of an evaluation target editor.

FIG. 2 is a flowchart showing a processing example of the evaluation target editor 111. When a user instructs a start of an evaluation target edition from the input device 13, the evaluation target editor 111 is actuated to then execute the processes shown in FIG. 2.

At first, the evaluation target editor 111 switches between a new edition of a function block diagram and an update of a previously prepared function block diagram, in accordance with a selection input from the user (S11).

If it is updated (S11-N), the user reads out a function block diagram indicated by a file name from the input device 13, from the evaluation target memory 141 of the memory 14 (S12). Then, an edition window in which this read out function block diagram is initially indicated is displayed on the display 12 (S13).

If it is not updated and it is newly prepared (S11-Y), an edition window in which the function block diagram is not indicated is displayed on the display 12 (S13).

After that, an editing process is executed on the edition window, correspondingly to various edition operations from the user (S14). When the edition operation is ended, the edited function block diagram is stored as a file in the evaluation target memory 141 (S15). Then, the evaluation target editor 111 ends the process.

Figure 3:
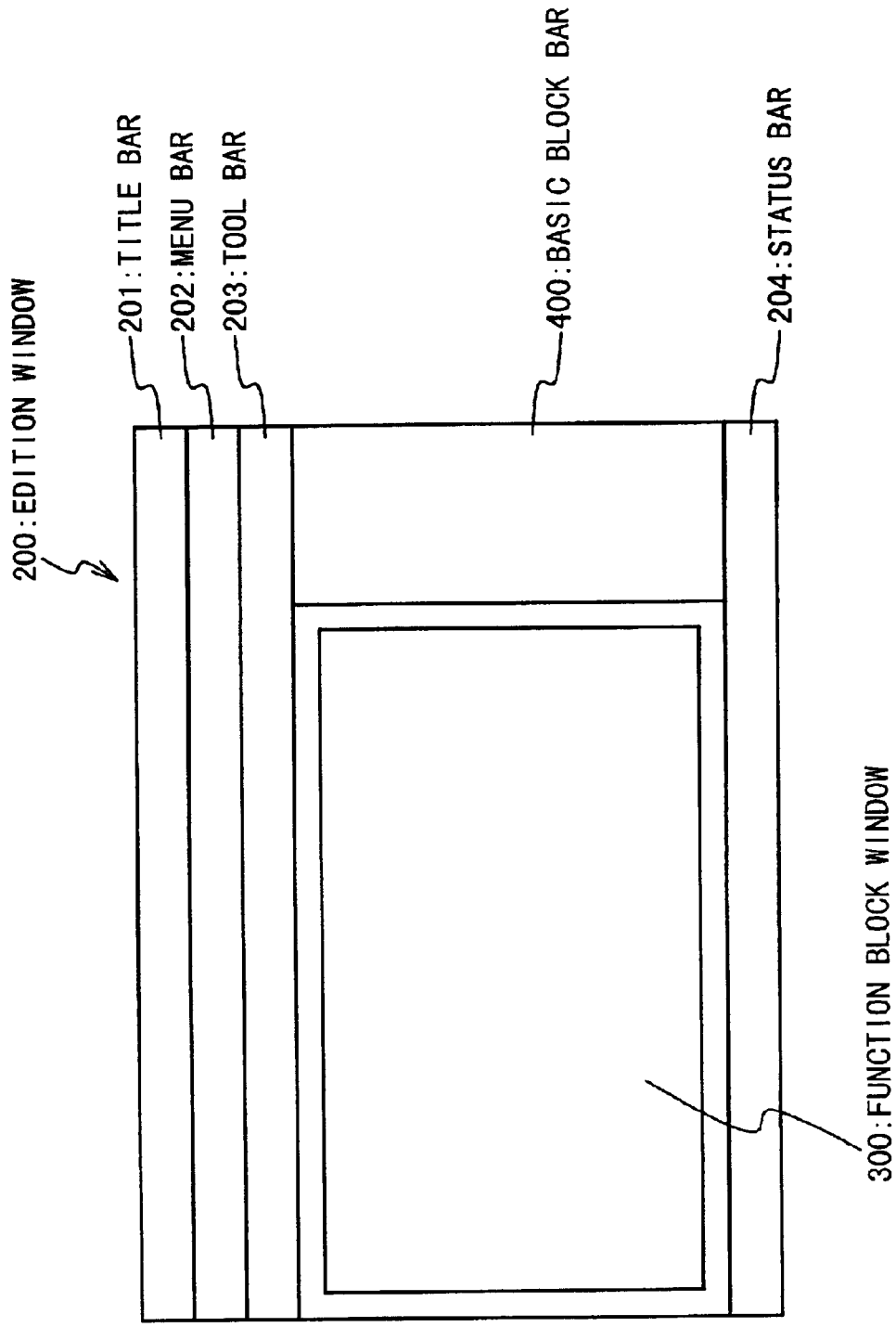
FIG. 3 is a view showing a configuration example of a function window.

FIG. 3 shows a configuration example of the edition window. An edition window 200 is provided with a title bar 201, a menu bar 202, a tool bar 203, a status bar 204, a function block window 300 and a basic block bar 400.

A name of the evaluation target editor 111 is displayed on the title bar 201. Menu items, such as [File], [Edition], [Display], [Insertion] and the like, are displayed on the menu bar 202. When the menu item is clicked, a drop down menu is further displayed, and a command to be executed can be selected.

A series of buttons indicative of commands are displayed on the tool bar 203. As typical commands, there are edition commands such as a cut, a copy, a paste, a retry and the like, and other commands such as an overwrite storage, a new preparation and the like.

The function block window 300 is the window to prepare a function block diagram. The basic block bar 400 is a part in which a button of a basic block is indicated.

The user suitably selects the basic block by using the button on the basic block bar 400, and places it at a proper portion on the function block window 300, and then prepares a desirable function block diagram on the function block window 300.

Figure 4:
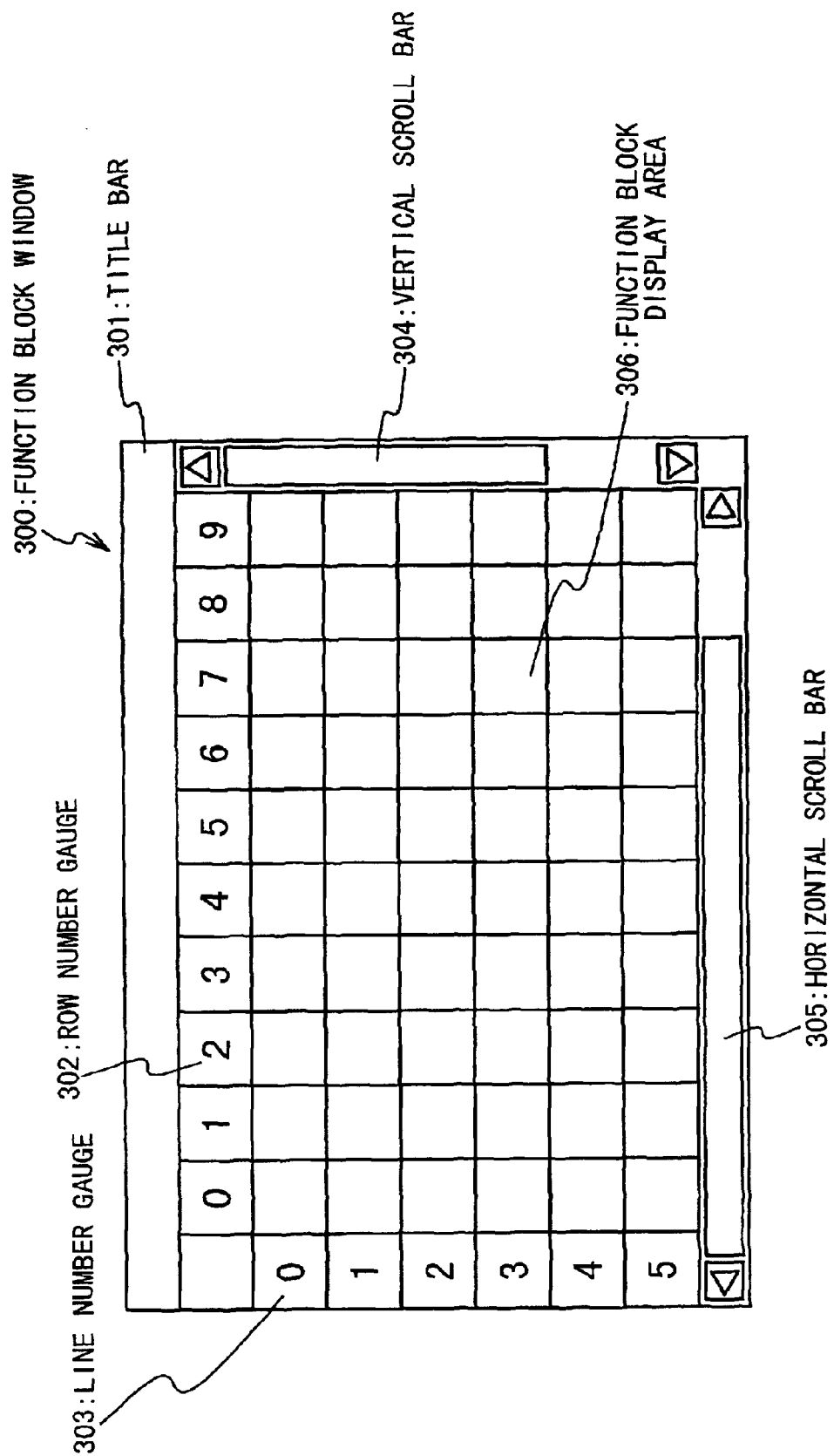
FIG. 4 is a view showing a configuration example of a function block window.

FIG. 4 shows a configuration example of the function block window 300. The function block window 300 in this example is composed of a title bar 301, a row number gauge 302, a line number gauge 303, a vertical scroll bar 304, a horizontal scroll bar 305 and a function block display area 306.

The function block display area 306 is divided into cells by longitudinal and lateral frame lines. A line number of a cell is indicated in the line number gauge 303, and a row number of a cell is indicated in the row number gauge 302, respectively.

The vertical scroll bar 304 is used to adjust a vertical position of a portion indicated in the function block window 300. The horizontal scroll bar 305 is used to adjust a horizontal position of a portion indicated in the function block window 300.

When any of the cells indicated in the function block window 300 is clicked by using a mouse, its cell becomes an active cell. When a button of the basic block is clicked on the basic block bar 400 of FIG. 3, its basic block is inputted to the active cell. If the basic block is already inputted to the active cell, it is overwritten by a new basic block.

When the basic block is inputted to the active cell, a property window is opened in the function block window 300, and a detailed information of the basic block inputted to the active cell is displayed. The detailed information of the basic block can be changed in the property window. By the way, the already input basic block is selected to then open its property window.

Figure 5:
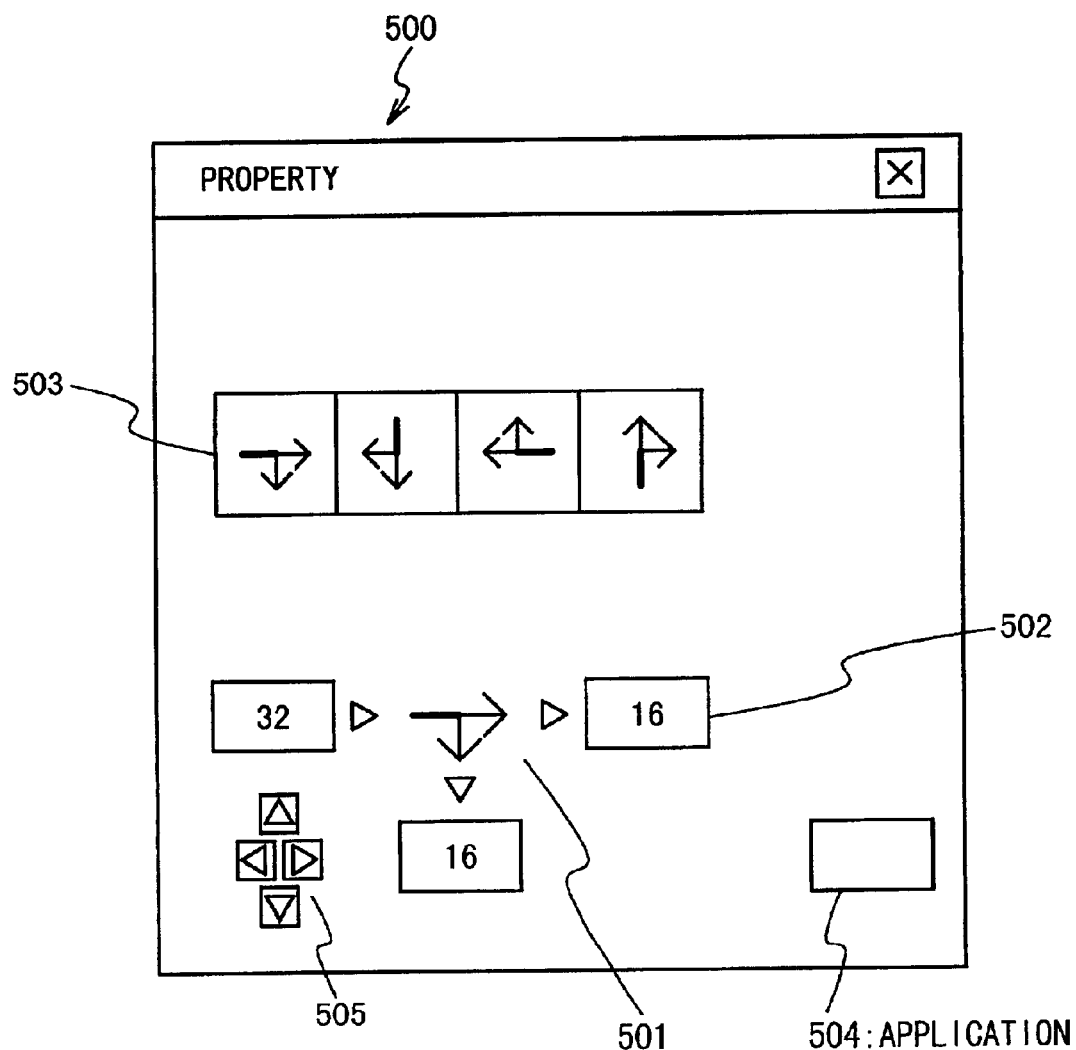
FIG. 5 is a view showing a configuration example of a property window.

FIG. 5 shows a configuration example of the property window. A property window 500 in this example is a unit block branching in a line (wiring). An image 501 of the unit block at a time of an application is displayed at a center of the property window 500. An input/output data width definition edition box 502 is positioned around the property window 500.

Rotation buttons 503 of four kinds of 0°, 90°, 180° and 270° are positioned in the upper portion of the property window 500. When any of the rotation buttons 503 is operated, the image 501 is changed depending on its operation.

When the detailed information of the basic block or the unit block is changed, the rotation angle and the input/output data width are changed by using the rotation button 503 and the data width definition edition box 502. Then, an application button 504 is clicked. By the way, a direction key variation button 505 is used to move the active cell instead of a direction key on the keyboard.

Figure 6:
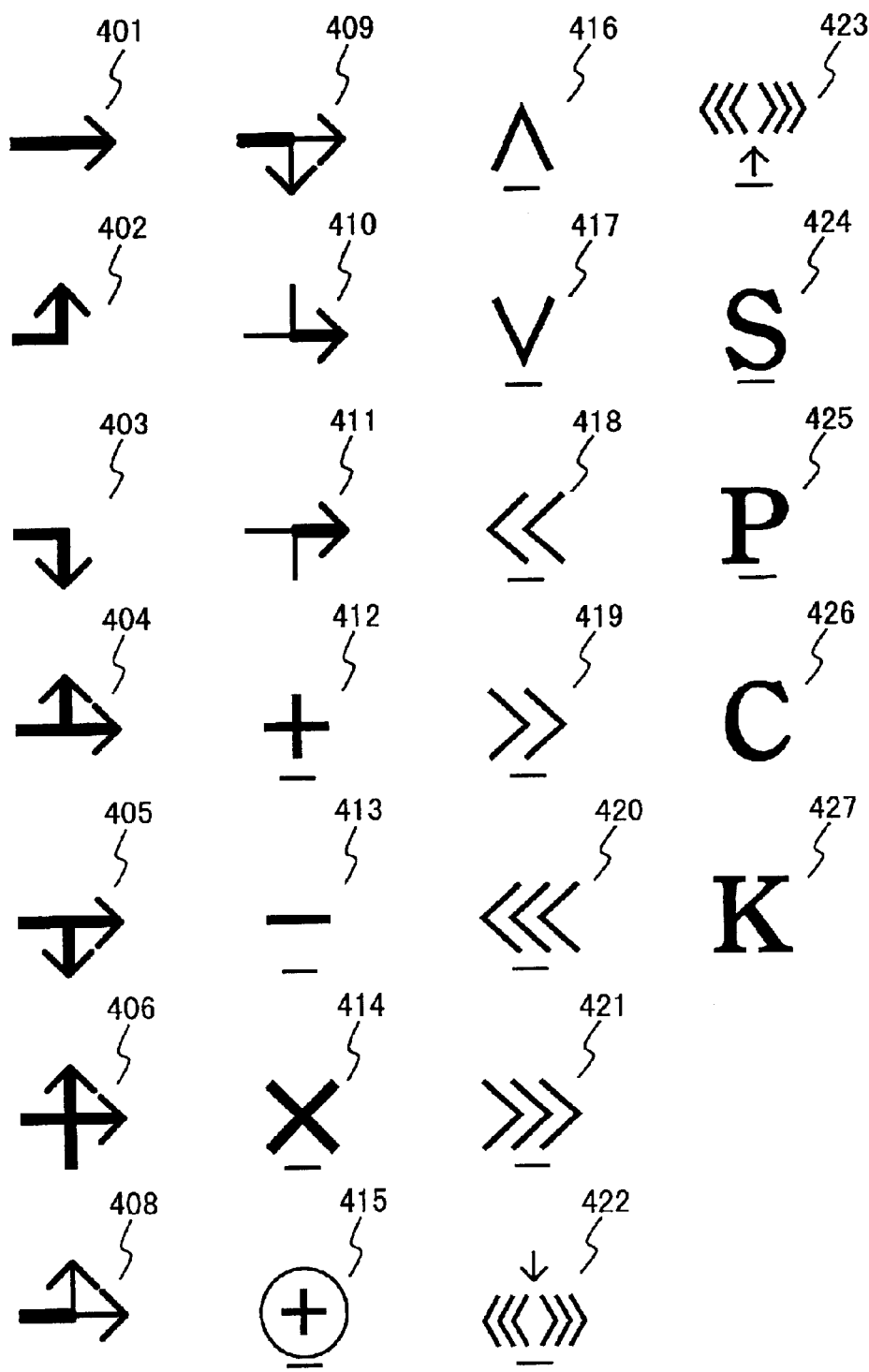
FIG. 6 is a view showing a list of a basic block that can be selected on a basic block bar.

FIG. 6 shows a list of the basic blocks or the unit blocks that can be selected on the basic block bar 400. The basic blocks are roughly divided into the following groups.
(A) Connection (Unit Blocks 401 to 411)
(B) Calculation Operation (Unit Blocks 412 to 414)
(C) Logical Operation (Unit Blocks 415 to 417)
(D) Shift (Unit Blocks 418 to 419)
(E) Rotation Shift (Unit Blocks 420 to 423)
(F) Others (Unit Blocks 424 to 427)

The unit blocks 401 to 411 for the connection are further classified into the following kinds.
○ Line; This is a unit block to connect two adjacent basic blocks to each other through a line of the same data width. The unit blocks 401 to 403 belong to it. The reason why the plurality of kinds are prepared is to enable the connection in any direction. The rotation angle and the data width can be set in those property windows.
○ Fork; This is a unit block to branch a line in two directions in the same data width. The unit blocks 404, 405 belong to it. The reason why the two kinds are prepared is to enable the branch in any direction. The rotation angle and the data width can be set in those property windows.
○ Cross; This is a unit block that is used in a portion where two lines cross each other. The unit block 406 belongs to it. The rotation angle and the data width can be set in this property window.
○ Partition; This is a unit block to divide a data width and branch a line in two directions. The unit blocks 408, 409 belong to it. The reason why the two kinds are prepared is to enable the branch in any direction. The rotation angle, the data width of the input line, and the data width for each output line can be set in those property windows.
○ Join; This is a unit block to couple two lines to one line. The unit blocks 410, 411 belong to it. The reason why the two kinds are prepared is to enable the coupling from any direction. The rotation angle, the data width for each input line, and the data width for each output line can be set in those property windows.

An addition unit block 412, a subtraction unit block 413 and a multiplication unit block 414 are prepared as the unit blocks for the calculation operation. The rotation angle and the data width can be set in the property windows of the addition unit block 412 and the subtraction unit block 413. The rotation angle, the data width for each input and the data width for each output can be set in the property window of the multiplication unit block 414.

An exclusive-OR unit block 415, a logical AND unit block 416 and a logical-OR unit block 417 are prepared as the unit blocks for the logical operation. The rotation angle and the data width can be set in those property windows.

A left shift unit block 418 and a right shift unit block 419 are prepared as the unit blocks for the shift. The rotation angle, the data width and the shift amount can be set in those property windows.

A left rotation shift unit block 420, a right rotation shift unit block 421, an upper input dynamic rotation shift unit block 422 and a lower input dynamic rotation shift unit block 423 are prepared as the unit blocks for the rotation shift.

The difference between the unit blocks 420, 421 and the unit blocks 422, 423 lies in the fact that in the former unit blocks 420, 421, the shift amounts are fixed to the preliminarily set values, and in the latter unit blocks 422, 423, the data from the adjacent unit blocks are inputted as the shift amounts.

The rotation angle, the data width and the shift amount can be set in the property windows of the left and right rotation shift unit blocks 420, 421.

The rotation angle, the data width, and the data width of the data providing the shift amount can be set in the property windows of the upper and lower input dynamic rotation shift unit blocks 422, 423.

As the rests, there are a replacement table unit block 424 for replacing a data composed of a plurality of bits by another data composed of a plurality of bits, a replacement table unit block 425 for replacing a bit position, a constant unit block 426 and a key unit block 427.

The rotation angle and the input/output data width can be set in the property window of the replacement table unit block 424. The rotation angle, the input/output data width and an input bit position corresponding to an output bit position can be set in the property window of the replacement table unit block 425. The rotation angle can be set in the property windows of the constant unit block 426 and the key unit block 427.

By the way, a function of editing the contents of the key, the constant and the replacement table to be actually used in the encryption algorithm is omitted in the evaluation target editor 111 in this embodiment. However, it is naturally possible to install such a function into the evaluation target editor 111.

The user executes the placements of the basic blocks 401 to 427 and the adjustments of their properties, as mentioned above, a plurality of times, and prepares the desirable function block diagram on the function block window 300.

Figure 7:
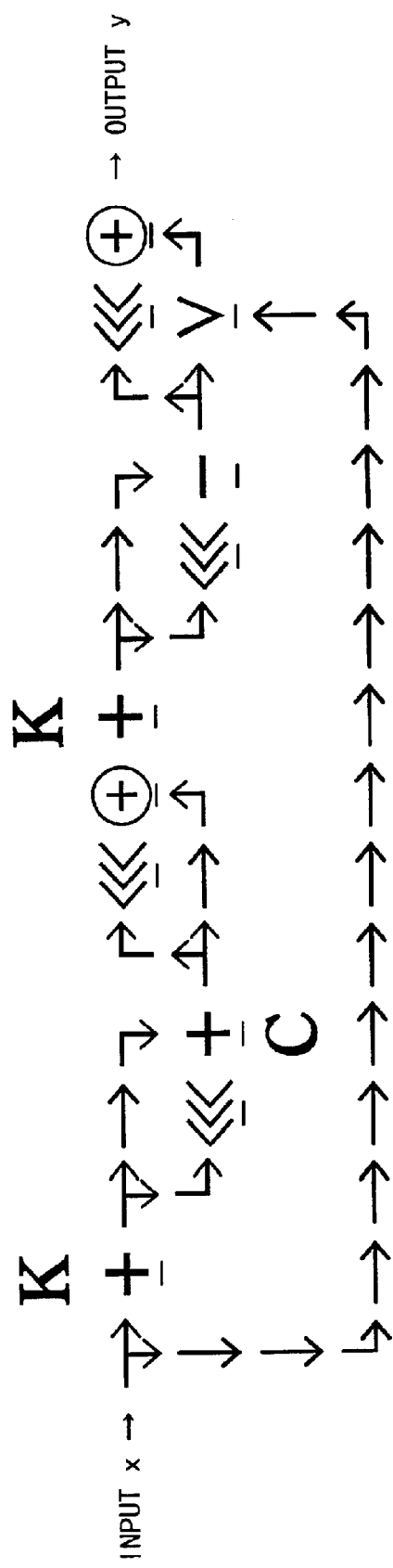
FIG. 7 is a view showing an example of a function block diagram.

FIG. 7 shows an example of the prepared function block diagram. When an input is assumed to be x and an output is assumed to be y, the function block diagram of FIG. 7 corresponds to the following equation:

$$y=(e<<n4)\odot(e\vee x).$$

Here, e={(d<<n3)−d}, d={(b<<n2)⊙b)+K, and b=(a<<n1)+C+x+K. ⊙ denotes the exclusive-OR, ∨ denotes the logical-OR, << denotes the left shift, and n1 to n4 denote the shift amounts of a total of four left shift unit blocks in FIG. 7, respectively.

A file name indicated by the user is given to the function block diagram after the edition. It is stored in the evaluation target memory 141, for example, with {(Row Number of Cell, Line Number), Detailed Information of Basic Block} as one record.

(2) Score Calculation of Function Block Diagram

Figure 8:
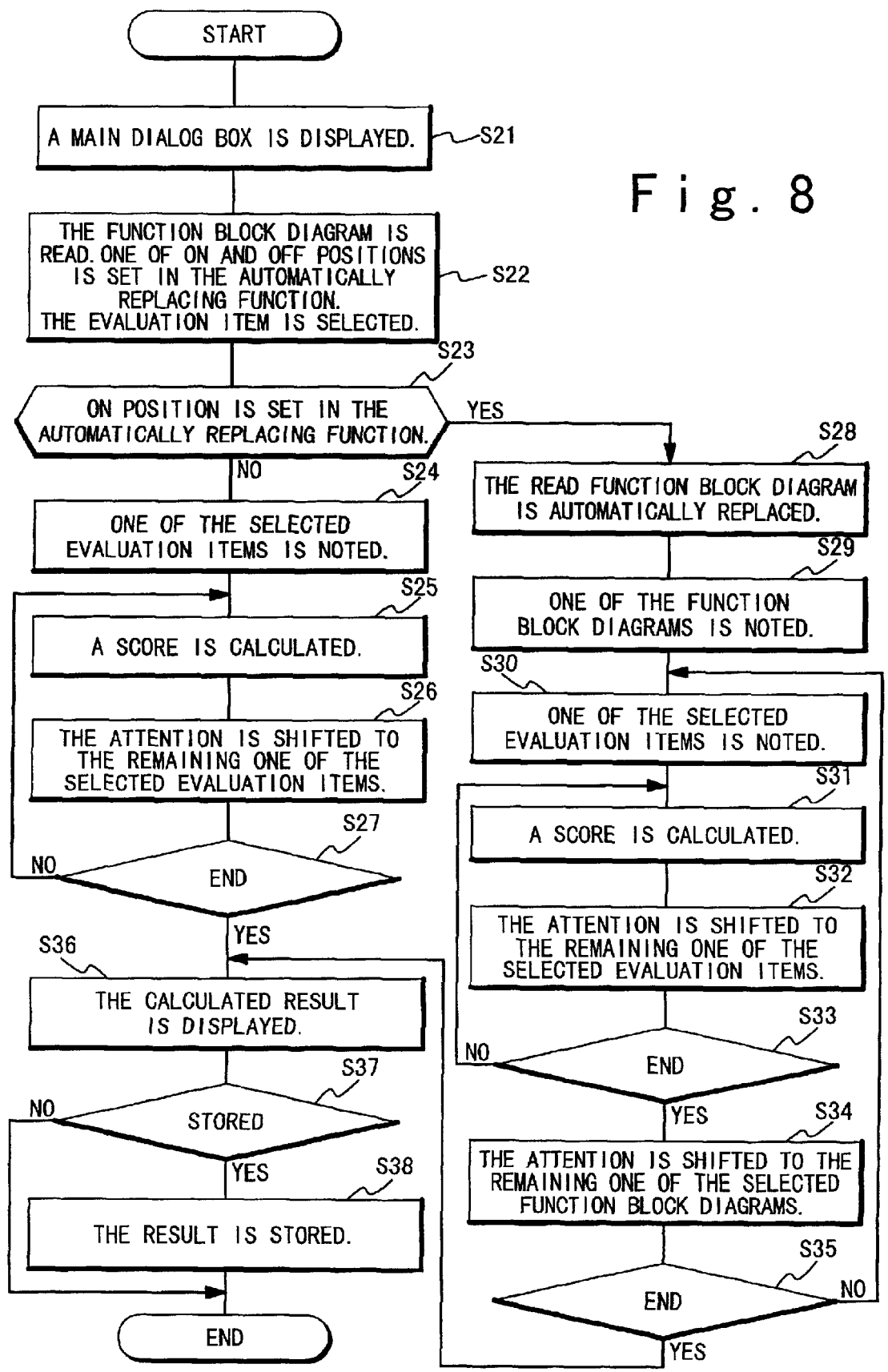
FIG. 8 is a flowchart showing a processing example of an evaluation executor.

FIG. 8 is a flowchart showing a processing example of the evaluation executor 112. When the user instructs the start of the evaluation execution from the input device 13, the evaluation executor 112 is actuated to then execute the processes shown in FIG. 8.

At first, the evaluation executor 112 displays a main dialog box on the display 12 (S21). Then, the evaluation executor 112 instructs the user to indicate whether or not the function block diagram, the evaluation item and the automatically replacing function targeted for the calculation can be used, by using this main dialog box, and then executes the necessary preliminary preparation such as an operation for reading in the function block diagram and the like (S22).

Figure 9:
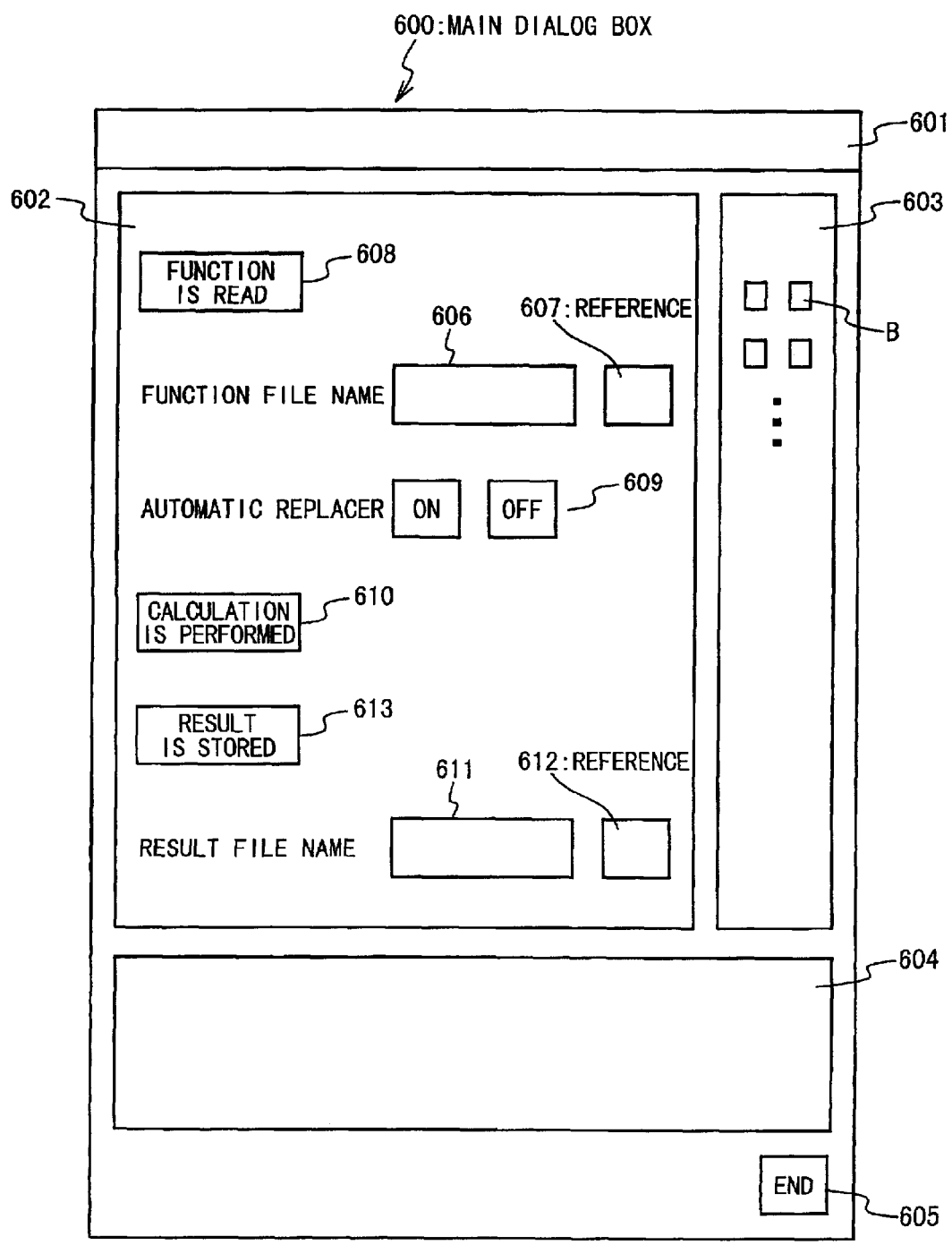
FIG. 9 is a view showing a configuration example of a main dialog box.

FIG. 9 shows a configuration example of the main dialog box. A main dialog box 600 in this example is composed of a title bar 601, a function block operator 602, an evaluation item selector 603, a result display area 604 and an end button 605. A name of the evaluation executor 112 is displayed on the title bar 601.

Buttons B to select predetermined several evaluation items are displayed on the evaluation item selector 603. The user clicks the button B, and selects the evaluation item. A plurality of evaluation items can be selected at the same time. The result display area 604 is the area to indicating a calculation result. The end button 605 is the button to indicate the end of the evaluation execution.

The function block operator 602 has an edition box 606 to enter a file name of a function block diagram on which an evaluation is performed. The user can directly enter a file name from the input device 13 to the edition box 606. Moreover, if the user clicks a reference button 607, a list of file names of function block diagrams stored in the evaluation target memory 141 is displayed so that the user can select and enter from it.

When a function read button 608 is clicked after the input of the file name, the evaluation executor 112 reads therein the corresponding function block diagram from the evaluation target memory 141.

The function block operator 602 has the on and off buttons 609 for the automatically replacing function so that the user can select any of them.

If the automatically replacing function is turned on, the evaluation executor 112 indicates on the display 12, a trial mass selection window in which a function block diagram whose file name is indicated in the edition box 606 is expanded into a window similar to the function block window of FIG. 4, and then instructs the user to select a trial mass on its screen.

The trial mass implies a cell at which a unit block of the automatically replacing target is positioned. The trial mass can be selected, for example, by clicking a cell at which a unit block serving as a replacement source is positioned.

The evaluation executor 112, if the unit block positioned at the selected trial mass is a unit block that can be replaced by another unit block, determines that the selection of the trial mass is effective, and if it is a unit block that can not be replaced by another block, indicates its fact and prompts the user to select another cell.

Whether or not it can be replaced by another basic block is judged by searching through the replaceable part list 144 with the kind of the unit block positioned at the selected trial mass as a key, and then judging whether or not at least one or more replaceable unit blocks are set.

Moreover, the function block operator 602 has a calculation execution button 610 to instruct a start of a calculation, an edition box 611 to enter a file name to store a calculation result, its reference button 612 and a result storage button 613.

The user can directly enter a file name from the input device 13 to the edition box 611. Moreover, if the user clicks the reference button 612, a list of evaluation result file names stored in the evaluation result memory 143 is displayed so that the user can select and enter from it.

When the result storage button 613 is clicked after the input of the file name, the evaluation executor 112 stores the calculation result in the corresponding file.

The evaluation executor 112, after the completion of the reading operation of the function block diagram targeted for the evaluation, the on/off setting of the automatically replacing function and the selection of the evaluation item, if the calculation execution button 610 is clicked, switches the process between the on and off cases of the automatically replacing function (S23 of FIG. 8). The respectively classified cases will be described below.

○ When Automatically Replacing Function is Turned OFF

The evaluation executor 112 pays attention to one of the selected evaluation items (S24), refers to a point of each unit figure with regard to the evaluation item in the point memory 142, and then calculates a score with regard to the evaluation item targeted for the evaluation (S25).

The method for calculating the score will be described later. After the calculation of a score of one evaluation item, the attention is shifted to the remaining one of the selected evaluation items (S26, S27). The similar processes are repeated. Hereafter, the scores of the evaluation target function block diagram are calculated for all the selected evaluation items.

○ When Automatically Replacing Function is Turned ON

The evaluation executor 112 sends the function block diagram targeted for the evaluation and the information of the trial mass to the automatic replacer 116, and instructs it to automatically replace the function block diagram (S28).

Figure 10:
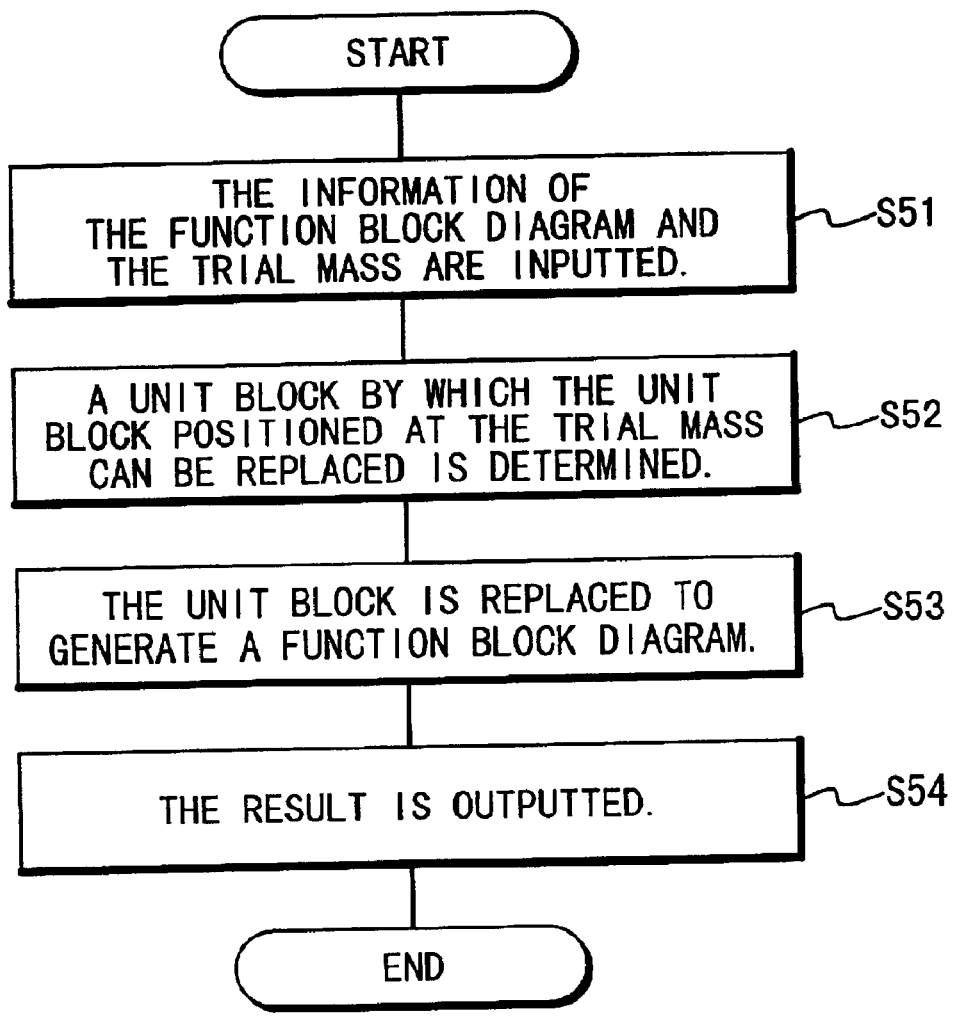
FIG. 10 is a flowchart showing a processing example of an automatic replacer.

FIG. 10 shows a processing example of the automatic replacer 116. The automatic replacer 116, when receiving the information of the function block diagram and the trial mass from the evaluation executor 112 (S51), identifies the unit block positioned at the trial mass on the function block diagram, and searches through the replaceable part list 144 with the kind of the unit block as a key, and then determines a unit block by which the unit block can be replaced (S52).

Figure 11:
FIG. 11 is a view showing an example of a replacement part list.

FIG. 11 shows an example of the replaceable part list 144. The replaceable part list 144 describes a replaceable basic block for each unit block that can serve as a replacement source. In the case of FIG. 11, basic blocks 412, 413, 415, 416 and 417 for an addition, a subtraction, an exclusive-OR, a logical-AND and a logical-OR are indicated such that they can be replaced by each other. Also, the left and right shift unit blocks 418, 419 are indicated such that they can be replaced by each other. The left and right rotation shift unit blocks 420, 421 are indicated such that they can be replaced by each other. And, the replacement table unit block 424 and the replacement table unit block 425 are indicated such that they can be replaced by each other.

The automatic replacer 116, when determining the replaceable unit block, replaces the unit block of the trial mass in the function block diagram by the determined unit block, and accordingly generates at least one function block diagram for each replaceable unit block (S53). Then, it outputs the generated at least one function block diagram to the evaluation executor 112 (S54).

The evaluation executor 112, after the end of the automatically replacing operation, uses the function block diagram, which the user indicates as the evaluation target, and the at least one function block diagram generated by the automatic replacer 116, as an evaluation target function block diagram group, and firstly pays attention to one function block diagram in it (S29). Next, the processes at the steps S30 to S33 similar to those at the steps S24 to S27 are executed to then calculate the score for each evaluation item of the function block diagram. When the score calculation is ended for one function block diagram (S33; YES), the attention is shifted to one function block diagram remaining in the evaluation target function block diagram group (S34), and the score is calculated for each evaluation item of the function block diagram (S30 to S33). After that, similarly, the score for each evaluation item is calculated with regard to the function block diagram remaining in the evaluation target function block diagram group.

If the score calculation of the function block diagram is ended as mentioned above (S27 or S35; YES), the evaluation executor 112 displays the calculation result in the result display area 604 (S36). When the user holds the calculation result, if the user indicates the result file name, as mentioned above, and clicks the result storage button 613, the calculation result is stored in the evaluation result memory 143 (S37, S38). By the way, if the automatic replacer 116 is at an on-state, a function block diagram automatically generated by the automatic replacer 116 is automatically stored in the evaluation target memory 141, for example, under a file name in which a sequential number is given behind a file name of a function block diagram of a generation source.

The score calculation of a function block diagram will be described below by dividing into the methods for calculating the score and the point of the basic block.

○ Point of Basic Block

Figures 12, 13:
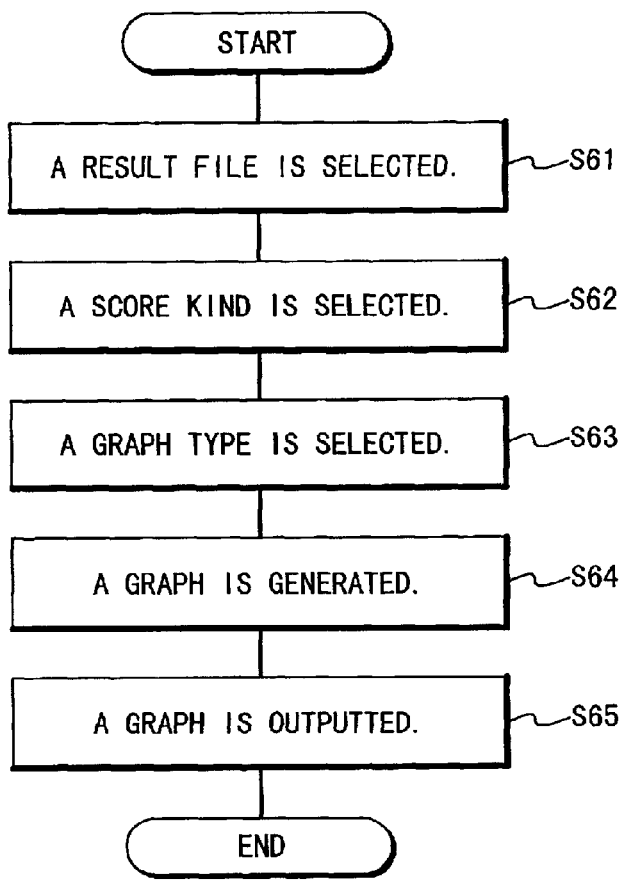
FIG. 12 is a view showing a configuration example of a point memory.
FIG. 13 is a flowchart showing a processing example of a result editor.

A point of a basic block is set in the point memory 142, at a unit of a bit, for each of evaluation items A, B to N, as shown in FIG. 12. The evaluation items A, B to N are actually the strength evaluation items, such as an avalanche evaluation, a relational evaluation between an input and an output, a relational evaluation between output bits, an evaluation of a bit balance and the like.

Here, the avalanche evaluation evaluates the degree of an influence on an output bit when a change of one bit is performed on an input data. The smaller the existence of the significant relation between an inversion location of an input and an inversion location of an output, and the smaller the existence of the significant relation between the number of inversion bits of an input and the number of inversion bits of an output, the higher the evaluation.

The relational evaluation between the input bit and the output bit evaluates the relation between each bit of the input data and each bit of the output data. The smaller the existence of an output bit value having a significant relation to an input bit value, the higher the evaluation.

The relational evaluation between the output bits evaluates the relation between the respective bits of the output data. The smaller the existence of the significant relation between the respective output bit values, the higher the evaluation.

The evaluation of the bit balance evaluates the occurrence frequencies of 1 and 0 for each bit of the output data. As the occurrence ratio of 0 and 1 in any output bit is closer to 1:1 irrespectively of the input value, the evaluation becomes higher.

The reason why the point is set in the point memory 142 for each evaluation item is as follows. That is, the influence on the encryption algorithm may be different even in the same basic block, if the evaluation item is different. So, the point to be given in its case must be different. For example, the basic blocks of the logical-OR and the logical-AND may act in a direction where the strength is made weaker with regard to the evaluation of the bit balance. However, they have no influence on the strength change with regard to the relational evaluation between the output bits, and act in a direction where the strength is made stronger with regard to the avalanche evaluation.

Also, the reason why the point of the basic block is set in the point memory 142 at the unit of the bit is that the influence on the strength change may be different depending on a bit position even in the same basic block. For example, in the avalanche evaluation, if an input bit lower than a self-output bit number is inverted, the unit blocks of the addition and the subtraction act in the direction where the strength is made stronger, because of the nonexistence of the significant relation. Thus, the influence on the strength change is different between a least significant bit having no input bit lower than the self-output bit number and the other bits.

As for a point for each bit of the basic block, for example, zero is given when there is no change in the strength. A positive number is given in the direction where the strength is made stronger, and a negative number is given in the direction where the strength is made weaker. The greater the absolute value, the larger the degree. The point is actually set by comparing between the basic blocks for each evaluation item and between the bits within the basic block and then defining a higher point for an element that is judged to have a good tendency with regard to the evaluation item by a person having a professional knowledge about an evaluation experience and defining a lower point for an element that is judged to have a bad tendency. By the way, it is not always necessary to define the points for all the basic blocks. For example, it can be omitted to give the points to the basic block for the key and the constant. In the basic block in which the point is not defined, there is not a point addition as described later.

○ Method for Calculating Score

An owned point is added at a unit of a bit. As a rule, a point of a pass basic block is added to a score of an input bit (in a case of a plurality of inputs, a sum thereof). An actual example of a point addition method for each kind of a unit block will be described below.

(a) Connection (Score of Input Bit+Point)

(b) Addition, Subtraction, Logical-OR, Logical-AND, And Exclusive-OR (Sum of Scores between Same Input Bits+Point)

(c) Multiplication (Value in Which Sum of Scores between Same Input Bit Numbers Is Expanded to Double Width+Point)

Here, the value extended to the double width is x1, x1, x2, x2, x3, x3, x4, x4, if the sum of the scores between the same input bit numbers is assumed to be, for example, x1, x2, x3, x4 (in a case of four bits).
(d) Shift (Score of Input Bit+Point) is shifted in accordance with the number of shifts, and zero is set for an empty output bit.
(e) Rotation Shift (Score of Input Bit+Point) is shifted in accordance with the number of shifts.
(f) Dynamic Rotation Shift (Minimum Point of Input Bit+Minimum Point of Shift+Point) is calculated to then replace the score of all the output bits.
(g) Replacement (Score of Input Bit+Point) is calculated to then replace the score of all the output bits by the minimum point of the calculation result.
(h) Replacement If the replacement table is defined, as for a bit occurring a plurality of times, (Score of Input Bit+Point) is calculated on the basis of the number of occurrences. As for a bit occurring only one time, it is shifted in its original state in accordance with the table. If the replacement table is not defined, (Score of Input Bit+Point) is calculated to then replace the score of all the output bits by the minimum point of the calculation result.

For example, in a logical-OR basic block for receiving input bits a0 to a31 and input bits b0 to b31 and carrying out a logical-OR for each of the bits and then generating output bits c0 to c31, if it is assumed that a point of a bit number 0 of the basic block is [1], a score of the input bit a0 is [3] and a score of the input bit b0 is [5], a score of the output bit c0 is 3+5+1=9. If this output bit c0 becomes an input bit d0 of a next basic block, it is treated that the input bit d0 has a score of [9].

The reason why the point addition method for sequentially adding the owned point for each pass of the unit block is employed is that the calculation is easy and that the calculation time per function block diagram is short. Of course, the present invention is not limited to such a calculation method.

By using the above-mentioned calculation method, in this embodiment, the following scores are calculated for each evaluation item, with regard to one function block diagram.
(a) Bit Score; This is a score for each output bit in an output of a function block diagram.
(b) Item Point; This is an average of the bit scores.
(c) Function Block Score; This is a sum of the item scores.

The bit score and the item score are calculated at the steps S25, S31, and the function block score is calculated at the time of the display of the calculation result at the step S36.
(3) Edition Output of Calculation Result FIG. 13 is a flowchart showing a processing example of the result editor 113. When the user instructs a start of a result edition output from the input device 13, the result editor 113 is actuated to then start the processes shown in FIG. 13. The result editor 113 firstly instructs the user to select a result file to be edited and outputted from a series of result file groups stored in the evaluation result memory 143 (S61). This may be done by the manner that the user directly enters a file name or the user selects after the display of the file name list on the display 12. The user may select only one file or select a plurality of files. If the user selects the plurality of files, the scores of a plurality of function block diagrams are displayed on the same graph.

Next, the result editor 113 instructs the user to select a score kind (S62). Here, there are a bit score and an item score as the score kind. If the bit score is selected, the evaluation item is jointly selected.

Next, the result editor 113 instructs the user to select a graph type (S63). This may be done, for example, by the manner that a list of the graph types is displayed on the display 12 and the user selects a desirable graph type from the list. As the graph types, there are a plurality of types, such as a radar chart, a polygonal line graph and the like.

When the result file and the graph type are determined, the result editor 113 reads in the corresponding result file from the evaluation result memory 143, prepares a graph based on the determined graph type (S64), and then displays on the display 12 (S65). If there is a printer, it is possible to print out.

Figure 14:
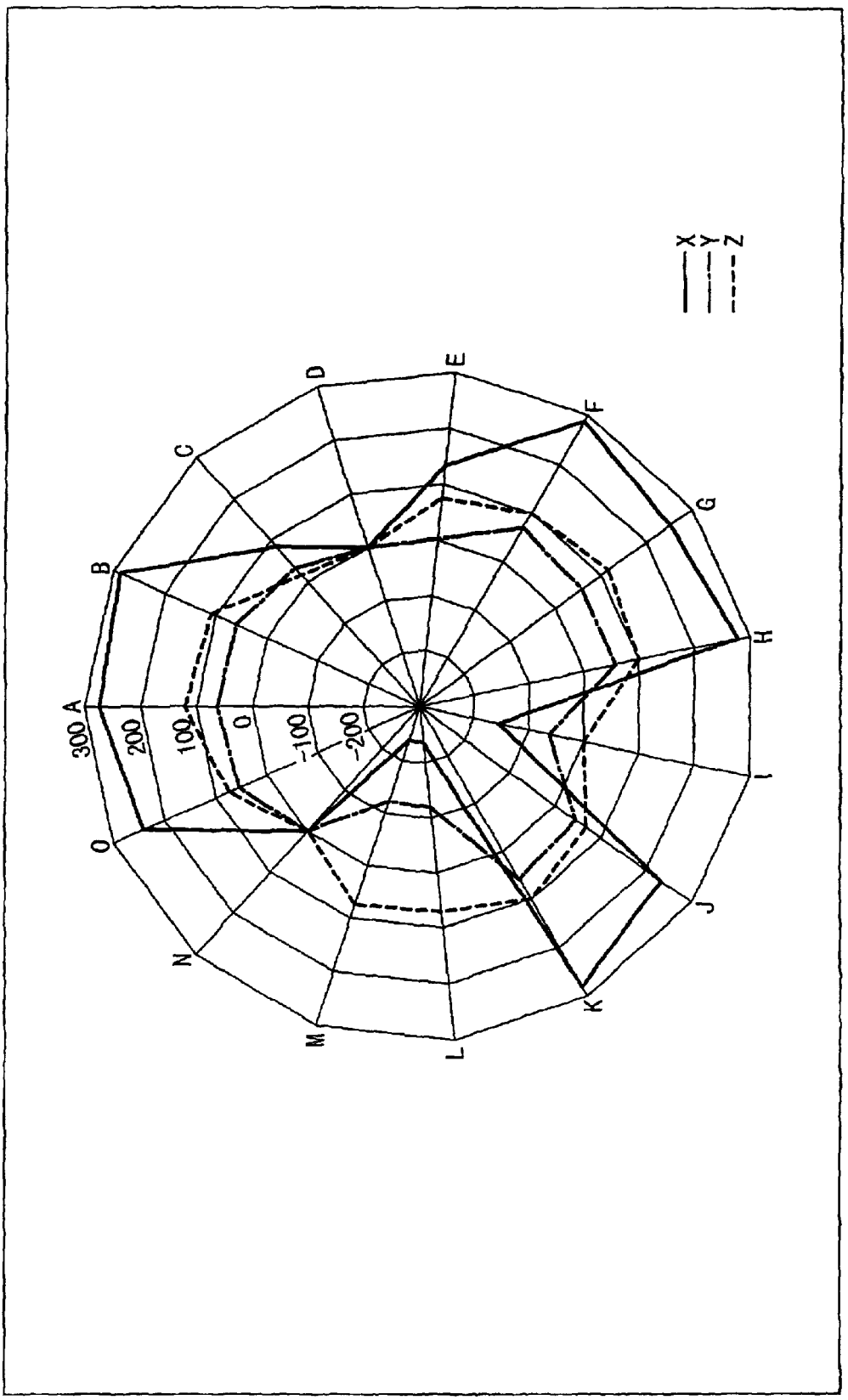
FIG. 14 is a view showing an example of a graph displayed on a display.
Figure 15:
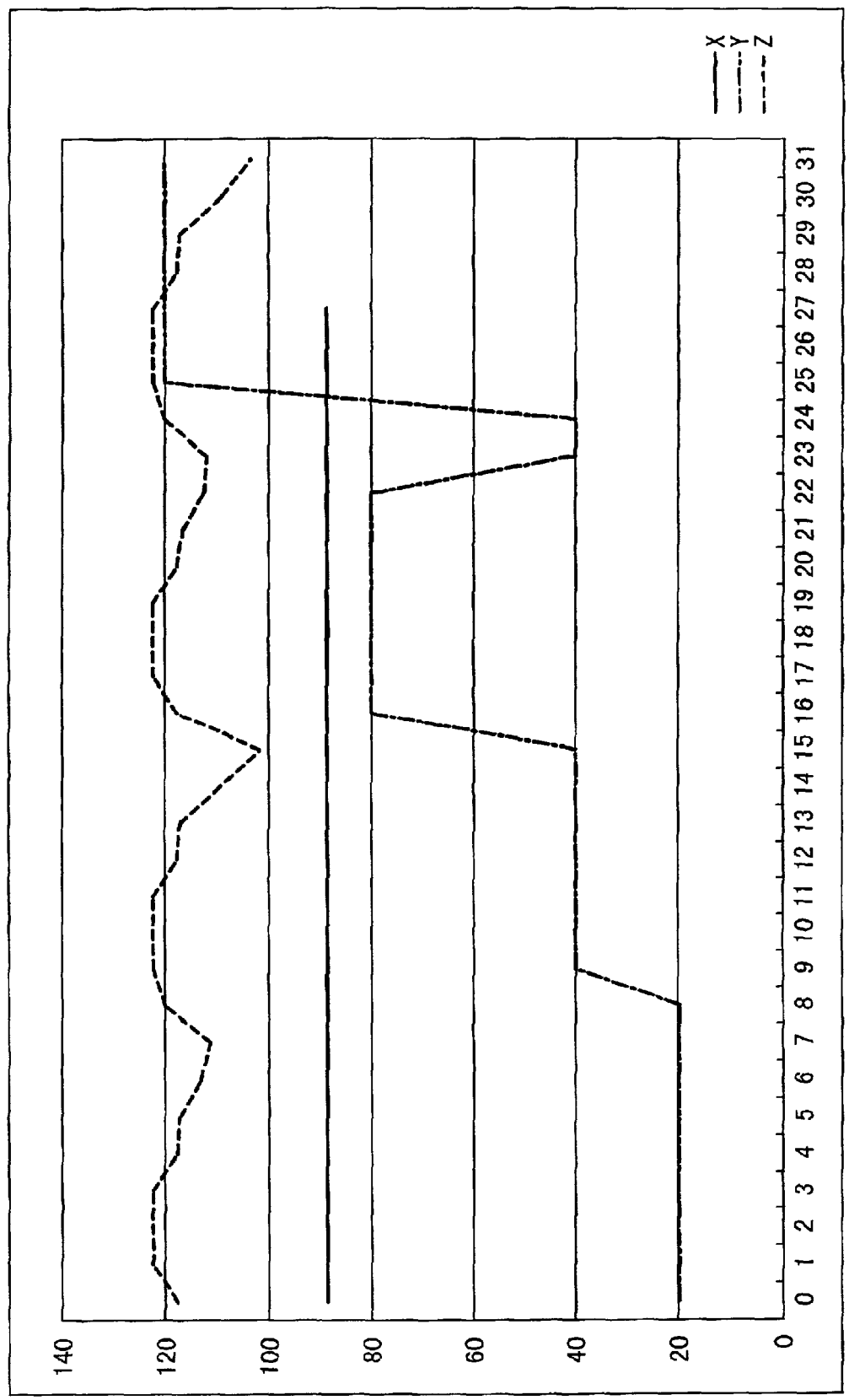
FIG. 15 is a view showing another example of the graph displayed on the display.

FIGS. 14 and 15 show the examples of the graphs displayed on the display 12. In FIG. 14, the item scores for each of the evaluation items A, B, . . . in a plurality of function block diagrams X, Y and Z are illustrated in the radar chart type. Typically, a good tendency is obtained as an area is wider. Thus, a comparison between the plurality of function block diagrams can be easily done. Also, whether or not a designed encryption algorithm is excellent can be judged by investigating the relation between the evaluation items with regard to an individual function block diagram.

In FIG. 15, the scores for each output bit with regard to a certain evaluation item A of the plurality of function block diagrams X, Y and Z are illustrated in the form of the polygonal graph. A horizontal axis denotes the output bit, and a vertical axis denotes the bit score. Typically, the good tendency is obtained as the graph is shifted upwardly. Thus, the comparison between the plurality of function block diagrams can be easily done. Also, whether or not the designed encryption algorithm is excellent can be judged by investigating the relation between the output bits with regard to the individual function block diagram.

Figure 16:
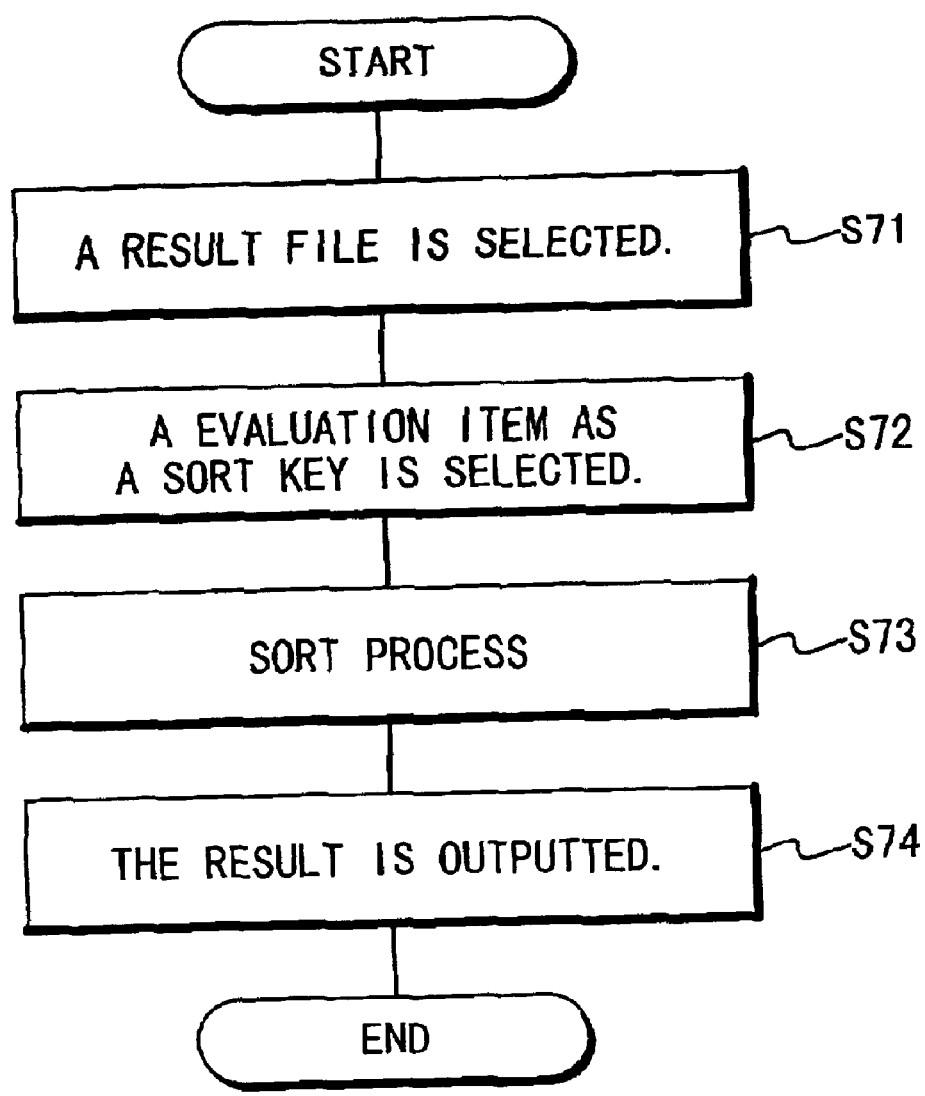
FIG. 16 is a flowchart showing another processing example of the result editor.

Also, the result editor 113 in this embodiment has a function of sorting the plurality of function block diagrams based on the scores. FIG. 16 shows its processing example. When the user instructs a start of a sort from the input device 13, the result editor 113 is actuated to then start the processes shown in FIG. 16. The result editor 113 firstly instructs the user to select a plurality of result files to be sorted from the series of result file groups stored in the evaluation result memory 143 (S71). This may be done by the manner that the user directly enters the file name or the user selects after the display of the file name list on the display 12.

Next, the result editor 113 instructs the user to select an evaluation item to be used for a sort key (S72). As the sort key, a maximum of m levels can be indicated from a first sort key to an m-th sort key. The user selects the number of sort keys and an evaluation item for each level, in accordance with a design requirement such as a encryption usage. Which evaluation item is used as the sort key of each level can be set for an external file. In this case, the external file may be selected.

When the result file and the sort key are determined, the result editor 113 reads in the corresponding result file from the evaluation result memory 143, and rearranges the result files in an order of decreasing the score (item score) of the evaluation item indicated by the sort key at the higher level (S73), and displays on the display 12 the sort result in which the result file names are arranged in the order starting from the highest order (S74). If there is the printer, it is possible to print out.

If the above-mentioned sort function is used, the superiority or inferiority in the plurality of function block diagrams can be easily judged, for example, by using the automatically replacing function, and selecting the result file of the plurality of function block diagrams (including the function block diagram at the generation source) generated by replacing a certain unit block by another unit block, and then carrying out the sort in which each evaluation item indicated at the time of the score calculation is indicated as the sort key. Of course, it is possible to sort a plurality of function block diagrams besides the function block diagram generated by the automatically replacing function.

Figure 17:
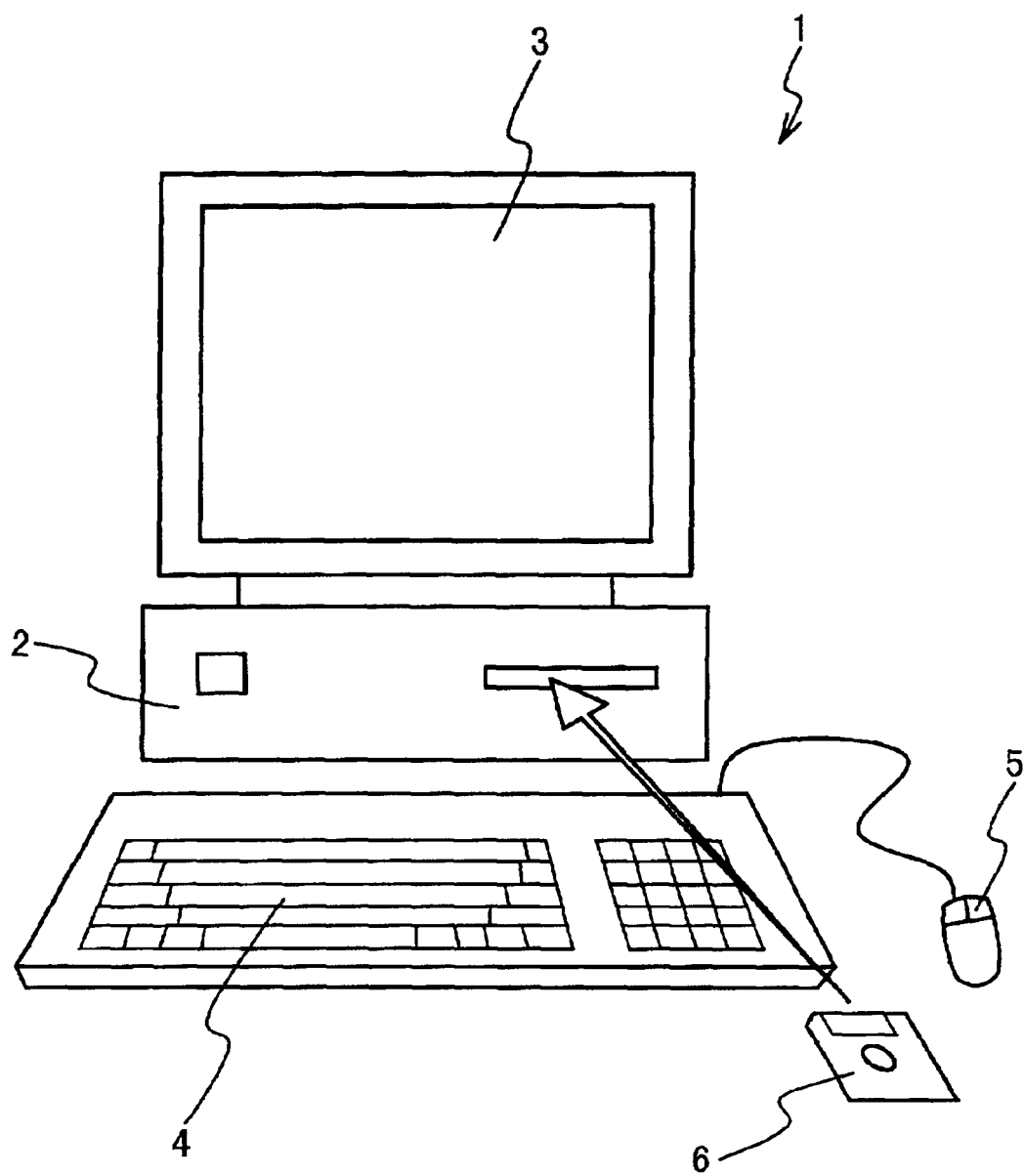
FIG. 17 is a plan view showing a configuration example of a computer to which the present invention is applied.

FIG. 17 is a plan view showing a configuration example of a computer to which the present invention is applied. A computer 1 is provided with: a computer body 2 including a central processor, a memory such as a main memory and the like, a hard disk device, a floppy disk device, a CD-ROM unit and the like; a display 3; a keyboard 4; and a mouse 5. 6 denotes a record medium that can be mechanically read, such as a floppy disk, a CD-ROM and the like. A encryption evaluation support program is recorded therein. The encryption evaluation support program recorded in the record medium 6, which is read in by the computer body 2, controls the operation of the computer body 2. Thus, it loads the evaluation target memory 141, the point memory 142, the evaluation result memory 143 and the replaceable part list 144 to the memory of the computer body 2, and generates the evaluation target editor 111, the evaluation executor 112, the result editor 113, the GUI 114, the memory interface 115 and the automatic replacer 116 on the computer body 2.

The embodiments of the present invention have been described as mentioned above. However, the present invention is not limited to the abovementioned embodiments. Other various additions and changes are possible. For example, the evaluation items about the mainly statistic encryption strength have been exemplified as the evaluation item. However, an evaluation item about a encryption strength against the attack such as the linear decoding method and the like can be applied under the same principle. Also, it can be applied to the estimation of a size and a processing amount when the designed encryption algorithm is executed in a software or a hardware, under the same principle. Moreover, it may be designed such that a macro function in which a plurality of basic blocks can be treated as a utility block, as if one basic block, is installed in the evaluation target editor 111.

As mentioned above, according to the present invention, the following effects can be obtained.

It is possible to largely reduce the evaluation time of the encryption algorithm. This reason is as follows. That is, it does not require the statistic process using the actual encryption algorithm, such as the encryption strength evaluation support apparatus noted in the document 2. The evaluation result can be obtained by using the non-statistic process of the score process in the stage of the figure representation of the encryption algorithm. However, the evaluation result based on the encryption evaluation support system of the present invention is inferior in accuracy to the evaluation result based on the encryption strength evaluation support apparatus noted in the document 2. Thus, it is necessary that a large number of designed encryption algorithms are firstly selected by the encryption evaluation support system of the present invention, and the several encryption algorithms at the high order are further accurately evaluated by using the encryption strength evaluation support apparatus noted in the document 2 and the like.

The person who is not the professional in the encryption design can evaluate the encryption algorithm. This is because the superiority or inferiority can be judged on the basis of the value such as the score. Moreover, the superiority or inferiority in the plurality of encryption algorithms can be judged depending on whether the score is higher or lower.

The configuration having the automatic replacer enables the large number of encryption algorithms to be effectively designed and evaluated. This is because the figure representation in which the indicated figure unit is replaced by another figure unit can be automatically prepared.

The configuration containing the result editor having the graphing function enables the superiority or inferiority to be intuitively grasped since the scores can be graphed. Also, the configuration containing the result editor having the sort function enables the order in the plurality of encryption algorithms to be automatically established.

What is claimed is:

1. An encryption evaluation support system, comprising:
   an evaluation executing unit receiving a figure representation of an encryption algorithm, wherein said figure representation includes a plurality of unit figures; and
   a point storing unit storing points allocated to said plurality of unit figures respectively, and
   wherein said evaluation executing unit gives said points to said plurality of unit figures of said figure representation, respectively, to output said points given to said plurality of unit figures of said figure representation.

2. The encryption evaluation support system according to claim 1, wherein said figure representation is a function block diagram.

3. The encryption evaluation support system according to claim 1, wherein said figure representation is described in a pre-defined encryption algorithm specification description manner, and
   wherein said unit figure is used in said encryption algorithm specification description manner.

4. The encryption evaluation support system according to claim 3, further comprising:
   an evaluation target editing unit supporting a user who generates said figure representation of said encryption algorithm based on said encryption algorithm specification description manner.

5. The encryption evaluation support system according to claim 1, wherein said evaluation executing unit outputs said points to evaluate said encryption algorithm corresponding to said figure representation, before an encryption program is generated based on said encryption algorithm.

6. The encryption evaluation support system according to claim 1, further comprising:
   an automatic replacing unit generating a changed figure representation in which at least one of said plurality of unit figures of said figure representation is automatically replaced by another unit figure, and
   wherein said point storing unit stores a point allocated to said another unit figure, and
   wherein said evaluation executing unit gives said points to a plurality of unit figures including said another unit figure of said changed figure representation, with reference to said point storing unit, respectively to output said points given to said plurality of unit figures of said changed figure representation.

7. The encryption evaluation support system according to claim 1, wherein said point storing unit stores said point allocated to said unit figure for each of a plurality of evaluation items, and
   wherein said evaluation executing unit gives said points for selected one of said plurality of evaluation items to said plurality of unit figures of said figure representation, respectively, with reference to said point storing unit to output said points for said selected one given to said plurality of unit figures of said figure representation.

8. The encryption evaluation support system according to claim 7, wherein said plurality of evaluation items include an evaluation item with regard to an encryption strength.

9. The encryption evaluation support system according to claim 7, wherein said plurality of evaluation items include an evaluation item with regard to an estimation of one of a size and a processing amount when said encryption algorithm is executed in one of a software and a hardware.

10. The encryption evaluation support system according to claim 1, wherein said evaluation executing unit gives said point to one of said plurality of unit figures of said figure representation, every time a signal flowing in said figure representation passes through said one of said plurality of unit figures of said figure representation.

11. The encryption evaluation support system according to claim 10, wherein said signal includes a plurality of bits, and wherein said plurality of bits of said signal are passed through said one of said plurality of unit figures in parallel, and wherein said point storing unit stores said point allocated to said unit figure for each of said plurality of bits, and wherein said evaluation executing unit gives said point for each of said plurality of bits to said unit figure with reference to said point storing unit, to output said point for each of said plurality of bits given to said figure representation.

12. The encryption evaluation support system according to claim 11, wherein said evaluation executing unit calculates a mean value of said points corresponding to said plurality of bits given to said figure representation, to output.

13. The encryption evaluation support system according to claim 1, further comprising:

a result editing unit presenting said points outputted by said evaluation executing unit in graphical form.

14. The encryption evaluation support system according to claim 13, wherein said result editing unit sorts said points outputted by said evaluation executing unit to present.

15. The encryption evaluation support system according to claim 1, wherein said encryption algorithm is a type of one of a common key cryptosystem and a public key cryptosystem.

16. A computer readable recording medium for recording a program for a process embodied thereon, comprising:

(a) receiving a figure representation of an encryption algorithm, wherein said figure representation includes a plurality of unit figures;

(b) storing points allocated to said plurality of unit figures respectively;

(c) giving said points to said plurality of unit figures of said figure representation, respectively; and (d) outputting said points given to said plurality of unit figures of said figure representation.

17. The computer readable recording medium for recording a program for a process according to claim 16, wherein said figure representation is described in a pre-defined encryption algorithm specification description manner, and wherein said unit figure is used in said encryption algorithm specification description manner.

18. The computer readable recording medium for recording a program for a process according to claim 16, wherein said (d) includes outputting said points to evaluate said encryption algorithm corresponding to said figure representation, before an encryption program is generated based on said encryption algorithm.

19. The computer readable recording medium for recording a program for a process according to claim 16, further comprising:

(e) generating a changed figure representation in which at least one of said plurality of unit figures of said figure representation is automatically replaced by another unit figure, and wherein said (b) includes storing a point allocated to said another unit figure, and wherein said (c) includes giving said points to a plurality of unit figures including said another unit figure of said changed figure representation, respectively, and wherein said (d) includes outputting said points given to said plurality of unit figures of said changed figure representation.

20. The computer readable recording medium for recording a program for a process according to claim 16, wherein said (b) includes storing said point allocated to said unit figure for each of a plurality of evaluation items, and wherein said (c) includes giving said points for selected one of said plurality of evaluation items to said plurality of unit figures of said figure representation, respectively, and wherein said (d) includes outputting said points for said selected one given to said plurality of unit figures of said figure representation.

21. The computer readable recording medium for recording a program for a process according to claim 16, wherein said (c) includes giving said point to one of said plurality of unit figures of said figure representation, every time a signal flowing in said figure representation passes through said one of said plurality of unit figures of said figure representation.

22. The computer readable recording medium for recording a program for a process according to claim 21, wherein said signal includes a plurality of bits, and wherein said plurality of bits of said signal are passed through said one of said plurality of unit figures in parallel, and wherein said (b) includes storing said point allocated to said unit figure for each of said plurality of bits, and wherein said (c) includes giving said point for each of said plurality of bits to said unit figure, and wherein said (d) includes outputting said point for each of said plurality of bits given to said figure representation.

23. The computer readable recording medium for recording a program for a process according to claim 22, wherein said (d) includes calculating a mean value of said points corresponding to said plurality of bits given to said figure representation, to output.

24. The computer readable recording medium for recording a program for a process according to claim 16, further comprising:

(f) presenting said points outputted by said (d) in graphical form.

25. The computer readable recording medium for recording a program for a process according to claim 24, wherein said (f) includes sorting said points outputted by said (d) to present.

* * * * *